United States Patent [19]

Mune et al.

[11] 4,362,833

[45] Dec. 7, 1982

[54] COMPOSITION FOR FORMING A RELEASE COATING LAYER

[75] Inventors: Isao Mune; Kihachi Suzuki; Toshimitu Okuno, all of Ibaraki, Japan

[73] Assignee: Nitto Electric Industrial Co., Ltd., Osaka, Japan

[21] Appl. No.: 264,524

[22] Filed: May 18, 1981

[30] Foreign Application Priority Data

May 16, 1980 [JP] Japan ................................. 55-65565

[51] Int. Cl.$^3$ .............................................. C08K 5/54
[52] U.S. Cl. .................................... 524/265; 524/266; 524/267; 524/269
[58] Field of Search ............... 260/29.6 NR; 524/265, 524/266

[56] References Cited

U.S. PATENT DOCUMENTS

| | | | |
|---|---|---|---|
| 3,575,910 | 4/1971 | Thomas | 260/29.6 |
| 3,933,702 | 1/1976 | Caimi et al. | 260/17 R |
| 4,101,492 | 7/1978 | Lindemann et al. | 260/29.6 NR |
| 4,127,460 | 11/1978 | Gaske et al. | 204/159.13 |

*Primary Examiner*—Joseph L. Schofer
*Assistant Examiner*—Bernard Lipman
*Attorney, Agent, or Firm*—Sughrue, Mion, Zinn, Macpeak & Seas

[57] ABSTRACT

An aqueous composition for forming a release coating layer on a substrate, comprising 100 parts by weight (solids basis) of a mixture of aqueous components of polysiloxanes and from about 20 to 100 parts by weight (solids basis) of an aqueous resin having film-forming ability, wherein the non-volatile content is from about 1 to 60% by weight. The aqueous composition is applied onto a non-permeable substrate to provide a substrate having thereon a release coating layer, which is suitable for use in the production, for example, of a surface protective sheet or tape, and a pressure-sensitive sheet or tape.

11 Claims, No Drawings

COMPOSITION FOR FORMING A RELEASE COATING LAYER

FIELD OF THE INVENTION

The present invention relates to an aqueous composition for forming a release coating layer. More particularly, it relates to an aqueous emulsion or solution-type composition to form a release coating layer on a non-permeable sheet or film substrate, which is suitable for use in the production of surface protective sheets, pressure-sensitive tapes, and the like.

BACKGROUND OF THE INVENTION

A surface protective sheet is bonded to a metal plate, a decorative plastic plate, a glass plate or the like through an adhesive layer in order to prevent the formation of scratches or fractures on the surface thereof during storage or transfer, or to protect the metal surface during working. Such surface protective sheets are described in detail, for example, in U.S. Pat. No. 3,600,268.

The surface protective sheet is rolled or wound on a reel and supplied in that state as a pressure-sensitive tape. That is, an adhesive layer on a sheet substrate is in contact with the reverse side of the sheet substrate. It is necessary therefore to provide a release coating layer on the reverse side of the sheet substrate so that the adhesive layer and the reverse side of the sheet substrate in contact therewith can be easily separated from each other. The release coating layer is further required to be firmly bonded to the reverse side of the sheet substrate so as to be not peeled off by the adhesive layer, because if the release coating layer is peeled off by the adhesive layer, when the surface protective sheet is bonded to a metal plate or the like, the release coating layer peeled off attaches to and stains the surface of the metal plate or the like.

Compositions which have heretofore been used to provide such a release coating layer on a substrate for surface protective sheets and pressure-sensitive adhesive tapes include a solution of an octadecyl (meth)acrylate-(meth)acrylic acid copolymer, silicone solutions, etc.

Release coating layers produced from these known compositions are not completely satisfactory; for example, release coating layers produced from the copolymer solutions are inferior in their release characteristics (i.e., in preventing the adhesive layer from sticking to the reverse side of the substrate), and although the silicone solutions provide release coating layers having excellent release characteristics, the excellent release characteristics contrarily deteriorate other characteristics.

When the silicone solution is coated on the sheet substrate and baked, the adhesion between the release coating layer formed and the sheet substrate is not sufficient because of its inherent physical properties. The silicone release coating layer formed, therefore, easily peels off. In particular, when the silicone solution is applied onto a plasticized polyvinyl chloride sheet substrate, the peeling-off of the silicone release coating layer is accelerated by the transfer of plasticizers thereinto from the sheet substrate. This gives rise to the problems that the release characteristics of the release coating layer is reduced, and that when the surface protective sheet obtained is bonded to a metal plate or the like, fine flakes of the coating film peeled off attaches to and stains the metal plate or the like.

Furthermore, the foregoing compositions are generally used as a solution using an organic solvent. The use of such organic solvents, however, is not desirable in that they may cause fire, explosion, etc., and, furthermore, they are somewhat toxic and may cause air pollution.

An aqueous composition has been proposed to provide a release coating layer without the use of an organic solvent, as described in Japanese Patent Application (OPI) No. 139835/76 (the term "OPI" as used herein refers to a "published unexamined Japanese patent application"). This aqueous composition is to be applied onto, in particular, a permeable substrate, such as paper, non-woven fabric, and cloth. That is, by application of the aqueous composition, back-sizing due to partial permeation of the aqueous composition into the permeable substrate, and formation of a release coating layer on the substrate can be attained at the same time. The aqueous composition comprises 100 parts by weight, based on solids content, of a resin emulsion and 0.5 to 100 parts by weight, based on solids content, of a silicone emulsion. It has been found, however, that when the aqueous composition is applied onto a non-permeable sheet substrate, a complete silicone coating layer cannot be formed as an uppermost layer, resulting in the formation of a release coating layer having poor release characteristics. Furthermore, the release characteristics of the release coating layer are markedly reduced when the release coating layer is allowed to stand at high temperatures and humidities for long periods of time.

SUMMARY OF THE INVENTION

The object of the invention is to provide an aqueous composition for forming a release coating layer which has good adhesion to a non-permeable non-porous sheet, specifically a plasticized polyvinyl chloride sheet and a polyolefin sheet, has good release characteristics, and which is firmly bonded to a sheet substrate.

It has now been found that this object can be attained by mixing two specific kinds of an aqueous component of polysiloxane and an aqueous resin having good affinity to a non-permeable sheet substrate in a specified proportion range.

This invention, therefore, provides an aqueous composition comprising:

100 parts by weight (solids basis) of a mixture of (A) 100 parts by weight (solids basis) of an aqueous component of organohydrogen polysiloxane containing at least three silicon-bonded hydrogen atoms in the molecule, represented by the formula (I):

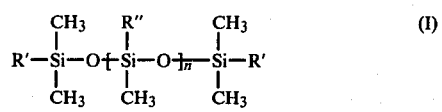

wherein R' is hydrogen or a methyl group, R" is hydrogen, an alkyl, aryl or alkenyl group, and n is an integer of from 5 to 500, and (B) from about 100 to 2,000 parts by weight (solids basis) of an aqueous component of diorganopolysiloxane containing a silicon-bonded hydroxy group at each terminal thereof, represented by the formula (II):

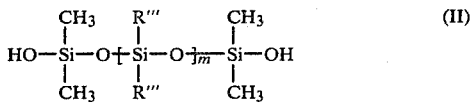

(II)

wherein R''' is a univalent hydrocarbon group which may be substituted, and m is an integer of from 100 to 15,000, and from about 20 to 100 parts by weight (solids basis) of an aqueous resin having a film-forming ability, wherein the solids content of the aqueous composition is from about 1 to 60% by weight.

DETAILED DESCRIPTION OF THE INVENTION

The organohydrogen polysiloxane represented by the formula (I) in the component (A) contains at least three silicon-bonded hydrogen atoms in the molecule. This organohydrogen polysiloxane is preferably such that in the unit $+R''Si(CH_3)O+_n$ of the formula (I), the average ratio of $R''=$hydrogen to $R''=$an alkyl, aryl, or alkenyl group is from about 0.25/1 to 1.0/1, and n is an integer of from 5 to 500. In particular, organohydrogen polysiloxane having a viscosity (measured by B-type viscometer, hereinafter the same) of from about 10 to 100 cSt at 25° C. is advantageously used. Suitable examples of such organohydrogen polysiloxanes include methylhydrogen polysiloxane, ethylhydrogen polysiloxane, and vinylhydrogen polysiloxane. These compounds are used in the form of an aqueous emulsion or solution. Thus, the terms "aqueous component of organohydrogen polysiloxane", "aqueous component of diorganopolysiloxane" and "aqueous resin" as used herein include both the aqueous emulsion (or dispersion) and aqueous solution.

The aqueous component of diorganopolysiloxane, component (B), is prepared by emulsifying or dissolving the diorganopolysiloxane represented by the formula (II) in an aqueous medium. Preferably, an aqueous emulsion obtained by emulsion polymerization of silane or siloxane is used. The viscosity of the diorganopolysiloxane itself is usually from about 10,000 to 1,000,000 cSt at 25° C. and preferably from about 50,000 to 500,000 cSt at 25° C. Diorganopolysiloxane having a viscosity of less than about 10,000 cSt provides a release coating layer having poor mechanical strength and elasticity. For diorganopolysiloxane having a viscosity of more than about 1,000,000 cSt, the rate of reaction between components (A) and (B) is retarded.

These organohydrogenate polysiloxane and diorganopolysiloxane are each mixed in the form of an aqueous component. The aqueous component of diorganopolysiloxane is added in an amount of from about 100 to 2,000 parts by weight (solids basis), preferably about 300 to 1,000 parts by weight, per 100 parts by weight (solids basis) of the aqueous component of organohydrogen polysiloxane.

As a catalyst to cure both polysiloxanes, an acid, an alkali, an amine, an organometallic salt, and the like are used. The amount of the catalyst added is within the range of from about 0.1 to 10 parts by weight per 100 parts by weight (solids basis) of the mixture of the aqueous components (A) and (B), although it can be changed according to the desired curing rate.

The resin which is used in admixture with the aqueous components (A) and (B) should have a strong film-forming ability. Particularly suitable resins are those capable of being uniformly mixed with both polysiloxanes in the form of an emulsion or a solution and those having a great chemical affinity to a non-permeable sheet.

As such aqueous resin, an acryl polymer emulsion, a vinyl acetate-acryl copolymer emulsion, and the like can be used for a plasticized polyvinyl chloride sheet, and an ethylene-vinyl acetate copolymer emulsion and the like can be used for a polyethylene sheet. In addition, an SBR latex, a polyvinyl alcohol aqueous solution, etc., can be used.

Of these aqueous resins, aqueous resins containing functional groups, e.g., a hydroxyl group or a carboxyl group, capable of reacting with the silicon-bonded hydrogen atom contained in the organohydrogen polysiloxane in component (A) are preferred in view of the properties of a release coating layer formed therefrom. That is, a polysiloxane cured product constituting the uppermost layer of the release coating layer effectively prevents the release coating layer from peeling off from the sheet substrate.

A preferred and typical example of such aqueous resins containing therein the functional group as described above is an acryl-based copolymer emulsion which is prepared by copolymerizing 100 parts by weight of a base monomer comprising at least one of an alkyl acrylate monomer having 1 to 8 carbon atoms in the alkyl moiety and an alkyl methacrylate monomer having 1 to 8 carbon atoms in the alkyl moiety and, optionally, a vinyl monomer copolymerizable therewith, from about 3 to 10 parts by weight of a carboxy group-containing copolymerizable monomer, and from about 1 to 30 parts by weight of a hydroxy group-containing copolymerizable monomer.

As the alkyl acrylate monomer which is used as a main component in the production of the foregoing acryl-based copolymer, butyl acrylate and 2-ethylhexyl acrylate are most suitable. In addition, other alkyl acrylates having 1 to 8 carbon atoms in the alkyl moiety can be used. These alkyl acrylates can be used in combination with each other.

The optimum alkyl methacrylates include methyl methacrylate, ethyl methacrylate, and butyl methacrylate. Additionally, other alkyl methacrylates having 1 to 8 carbon atoms in the alkyl moiety can be used. Furthermore, these alkyl methacrylates can be used in combination with each other.

Examples of copolymerizable vinyl monomers include styrene, vinyl acetate, acrylonitrile, and methacrylonitrile. Examples of carboxyl group-containing monomers include acrylic acid, methacrylic acid, maleic anhydride, and itaconic acid. Examples of hydroxy group-containing monomers include 2-hydroxyethyl acrylate, 2-hydroxyethyl methacrylate, 2-hydroxypropyl acrylate, diethyleneglycol monoacrylate, triethyleneglycol monoacrylate, tetraethyleneglycol monoacrylate, dipropyleneglycol monoacrylate, tripropyleneglycol monoacrylate, and tetrapropyleneglycol monoacrylate.

The aqueous resin as described above is added in an amount of from about 20 to 100 parts by weight (solids basis) per 100 parts by weight (solids basis) of the mixture of the aqueous polysiloxane components (A) and (B), and the solids content is adjusted to from about 1 to 60% by weight, preferably from 3 to 30% by weight, based on the total weight of the aqueous composition.

Although the aqueous composition of the invention is in a uniform dispersion state, when it is coated on a non-permeable sheet substrate and dried, a release coating layer consisting essentially of two layers results, one of the layers, a sheet-side layer, contains a large amount of the emulsion or solution of the resin having chemical affinity to the sheet substrate and the other layer, an outer layer, contains a large amount of the polysiloxane reaction product.

Various methods can be used to confirm the fact that the outer layer contains a large amount of the polysiloxane reaction product. The foregoing has been confirmed by coating an aqueous composition according to the invention on a sheet substrate, followed by drying to provide thereon the release coating layer, and then measuring XPS (X-ray photoelectron spectroscopy) and a static contact angle of pure water on the release coating layer. The measurement of the static contact angle of pure water is according to the method described in *Adhesion and Cohesion*, pages 176–179, Elsevier Publishing Company (1962).

Where a plasticized polyvinyl chloride sheet is used as a non-permeable sheet substrate, the resin layer in contact with the sheet substrate, i.e., an inner layer, has good compatibility with plasticizers coming from the plasticized polyvinyl chloride sheet and thus prevents the plasticizers from entering the outer layer (i.e., a polysiloxane layer). Furthermore, when a resin containing a functional group, e.g., a hydroxy group, is contained as the resin component, it reacts with organohydrogen polysiloxane containing silicon-bonded hydrogen atoms, preventing the polysiloxane layer from peeling off.

When the aqueous resin having the film-forming ability is added in an amount of less than about 20 parts by weight (solids basis) per 100 parts by weight (solids basis) of the mixture of the aqueous polysiloxane components (A) and (B), the polysiloxane layer formed is too thick compared with the resin layer and thus the release coating layer may peel off from the sheet substrate. On the other hand, when it is greater than about 100 parts by weight, the resin layer (inner layer) partially appears in the polysiloxane layer (outer layer), thereby reducing the release characteristics. Thus, the aqueous dispersion of the resin having the film-forming ability should be added within the range of about 20 to 100 parts by weight (solids basis) per 100 parts by weight (solids basis) of the mixture of the aqueous polysiloxane components (A) and (B).

When the solids content of the aqueous composition of the present invention is less than about 1% by weight, the thickness of the release coating layer is too small, resulting in a reduction of the release characteristics. On the other hand, when the non-volatile content is more than about 60% by weight, the coating amount is unnecessarily increased. Thus, the non-volatile content should be controlled within the range of from about 1 to 60% by weight.

Although the aqueous composition of the invention comprises materially the foregoing ingredients, it may contain dye, pigment, a viscosity-adjusting agent, and other additives, if desired.

As described above, when the aqueous composition of the invention is coated on a non-permeable sheet substrate and dried, a release coating layer consisting essentially of an outer layer composed mainly of the polysiloxane reaction product and an inner layer composed mainly of the film-forming resin is formed.

Formation of such double layers is useful to maintain the adhesion between the release coating layer and the sheet substrate. Furthermore, the boundary between the outer and inner layers is a mixed layer, thereby effectively preventing the release coating layer from peeling off from the sheet substrate.

In a plasticized polyvinyl chloride sheet from which plasticizers tend to come out, a resin layer (inner layer) composed mainly of a resin having a film-forming ability prevent plasticizers from transferring into the polysiloxane layer (outer layer) composed mainly of a polysiloxane reaction product. Furthermore, when a resin containing a functional group (e.g., a hydroxy group) capable of reacting with silicon-bonded hydrogen of polysiloxane is used as the resin having a film-forming ability, it undergoes a cross-linking reaction with polysiloxane, thereby effectively preventing the peel-off of a release coating layer formed.

Since the aqueous composition of the invention can provide a release coating layer which is capable of preventing the transfer of plasticizers and which has good release characteristics, it can be especially advantageously applied onto a plasticized polyvinyl chloride sheet. Non-permeable sheet substrates to which the aqueous composition of the invention can be applied include sheets or films of synthetic resins such as polyethylene, polypropylene, polyester, polyvinyl alcohol or polystyrene, cellulose film, metal foils such as aluminum foil or copper foil, etc.

A release coating layer formed by coating the aqueous composition of the invention on a sheet substrate is markedly less subject to peeling-off, even after storage under load, as well as under ordinary conditions, and effectively exhibits its release characteristics. The aqueous composition of the invention, therefore, is useful for use in back surface-processing of a surface protective sheet which is used for working of a metal plate. Additionally, the aqueous composition is useful for production of various pressure-sensitive sheets and release type sheets.

The invention will be hereinafter described in greater detail by reference to the following examples and comparative examples although it is not limited thereto. All parts are based on the weight of the solids content (solids basis) and all percents are by weight, unless otherwise indicated.

EXAMPLE 1

|  | Parts |
| --- | --- |
| Butyl Acrylate | 40 |
| Methyl Methacrylate | 60 |
| Acrylonitrile | 10 |
| Acrylic Acid | 3 |
| 2-Hydroxyethyl Methacryrate | 5 |
| Sorbitan Monolaurate | 3.2 |
| Sodium Alkylbenzenesulfonate | 0.8 |
| Deionized Water | 160 |

The above ingredients were placed in a reactor equipped with a thermometer, a stirrer, a nitrogen-introduction tube, and a reflux cooler, and were heated with stirring in a stream of nitrogen. When the temperature of the mixture reached about 60° C., 0.2 part of ammonium persulfate were introduced as a polymerization initiator to start polymerization, and the polymerization was continued for about 2 hours. After the polymerization was completed, the reaction system was heated to about 65° C. and aged at that temperature for about 1 hour to obtain an acryl emulsion containing the resulting copolymer. To the thus-obtained emulsion, the following compounds were added to obtain an aqueous composition.

|  | Parts |
| --- | --- |
| Organohydrogen Polysiloxane Emulsion (Syl-off 1171, produced by Dow Corning Corp.; solids content: 40%) | 30 |
| Diorganopolysiloxane Emulsion Containing Terminal Silicon-bonded Hydroxy Groups (SM-8701, produced by Toray Silicone Co., Ltd.; solids content: 30%) | 80 |
| Curing Catalyst (DC-22K, produced by Dow Corning Corp.; solids content: 24%) | 5 |
| Acryl Emulsion (as obtained above) | 100 |

The aqueous composition having the above formulation and a solids content of 10% (adjusted to this content with deionized water, and hereinafter the same) was coated uniformly on one side of a plasticized polyvinyl chloride film (HK film, produced by Kokoku Kagaku Co., Ltd.) in a coating amount (solids basis) of 0.6 g/m² and dried by heating at 145° C. for 2 minutes to obtain a test piece having a release coating layer.

An adhesive tape (Nitto-Polyester Tape No. 31B, produced by Nitto Electric Industrial Co., Ltd.) was adhered to the release coating layer of the test piece. The peel strength, residual adhesion strength, and residual adhesion strength retention ratio of the release coating layer at room temperature were measured, and additionally the peeling-off property of the release coating layer was examined. The results are shown in Table 3.

In order to examine the layer construction of a release coating layer formed from the aqueous composition of the invention, the following experiment was conducted using the same acryl emulsion, curing catalyst-containing polysiloxane emulsion and aqueous composition as above:

(A) The acryl emulsion alone, (B) the polysiloxane emulsion alone (containing the curing catalyst), and (C) the aqueous composition as above were each coated on separate pieces on one side of a polyvinyl chloride sheet as used above in a coating amount (solids basis) of 0.6 g/m² and dried by heating at 145° C. for 2 minutes to provide a test piece. With the thus-obtained test pieces, the surface of the release coating layer was examined by XPS (X-ray photoelectron spectroscopy) and the static contact angle of pure water therewith was measured. The results are shown in Table 1.

TABLE 1

| | Evaluation by XPS | | |
| --- | --- | --- | --- |
| | Strength of $\overset{\overset{O}{\|\|}}{C-O}$ Strength of C1s (%) | Strength of Si2p Strength of C1s (%) | Contact Angle of Pure Water (°) |
| Test Piece | | | |
| Coating Layer of (A) | 15 | 0 | 70 |
| Coating Layer of (B) | 2 | 28 | 105 |
| Coating Layer of (C) | 2 | 28 | 104 |

As can be seen from the above results, the release coating layer formed from the aqueous composition (C) is similar to that formed from the polysiloxane emulsion alone (B). This indicates that the surface layer of the release coating layer formed from the aqueous composition (C) contains a desirably large amount of polysiloxane reaction product, and that the release coating layer consists essentially of two layers.

EXAMPLE 2

|  | Parts |
| --- | --- |
| 2-Ethylhexyl Acrylate | 30 |
| Methyl Methacrylate | 55 |
| Acrylonitrile | 5 |
| Acrylic Acid | 4 |
| 2-Hydroxyethyl Acrylate | 10 |
| Sorbitan Monolaurate | 3.2 |
| Sodium Alkylbenzenesulfonate | 0.8 |
| Deionized Water | 160 |

The above ingredients were polymerized under the same reaction conditions as in Example 1 to provide an acryl emulsion. To the thus-obtained acryl emulsion, the following compounds were added to form an aqueous composition.

|  | Parts |
| --- | --- |
| Organohydrogen Polysiloxane Emulsion (SH-8200, produced by Toray Silicone Co., Ltd.; solids content: 40%) | 40 |
| Diorganopolysiloxane Emulsion Containing Terminal Silicon-bonded Hydroxy Groups (SM-8701, produced by Toray Silicone Co., Ltd.; solids content: 30%) | 120 |
| Curing Catalyst (Syl-off 1171A, produced by Dow Corning Corp.; solids content: 50%) | 5 |
| Acryl Emulsion (as obtained above) | 100 |

The aqueous composition having the above formulation and a solids content of 10% was treated in the same manner as in Example 1 to form a test piece, and the thus-obtained test piece was tested in the same manner as in Example 1. The results are shown in Table 3.

The same three emulsions as used above, the acryl emulsion alone (D), the curing catalyst-containing polysiloxane emulsion (E), and the aqueous composition (F) were each coated on one side of a plasticized polyvinyl chloride film in a coating amount (solids basis) of 0.6 g/m² and dried by heating at 145° C. for 2 minutes.

With the thus-obtained test pieces, the surface of the release coating layer was examined by XPS (X-ray photoelectron spectroscopy) and the static contact angle of pure water was measured. The results are shown in Table 2.

TABLE 2

| | Evaluation by XPS | | |
| --- | --- | --- | --- |
| | Strength of $\overset{\overset{O}{\|\|}}{C-O}$ Strength of C1s (%) | Strength of Si2p Strength of C1s (%) | Contact Angle of Pure Water (°) |
| Test Piece | | | |
| Coating Layer (D) | 16 | 0 | 70 |
| Coating Layer (E) | 2 | 26 | 102 |
| Coating | 2 | 26 | 101 |

TABLE 2-continued

| Test Piece | Evaluation by XPS | | |
|---|---|---|---|
| | Strength of C—O $\parallel$ O / Strength of C1s (%) | Strength of Si2p / Strength of C1s (%) | Contact Angle of Pure Water (°) |
| Layer (F) | | | |

EXAMPLE 3

As the aqueous dispersion of the resin having film-forming ability, a 15% aqueous solution of polyvinyl alcohol (PVA-205, produced by Kuraray Co., Ltd.; degree of saponification: 88 mol%) was used. To 100 parts of the aqueous solution of polyvinyl alcohol the following ingredients were added:

| | Parts |
|---|---|
| Organohydrogen Polysiloxane Emulsion (SH-8200, produced by Toray Silicone Co., Ltd.; solids content: 40%) | 40 |
| Diorganopolysiloxane Emulsion Containing Terminal Silicon-bonded Hydroxy Groups (HV-490, produced by Dow Corning Corp.; solids content: 35%) | 90 |
| Curing Catalyst (DC-22K, produced by Dow Corning Corp.; solids content: 24%) | 6 |

The thus-obtained mixture having a solids content of 8% was then uniformly coated on one side of a polyester film (Lumirror, produced by Toray Industries Inc.) in a coating amount (solids basis) of 0.6 g/m² and treated in the same manner as in Example 1 to provide a test piece. The test piece was subjected to the same testing as in Example 1. The results are shown in Table 3.

EXAMPLE 4

A test piece (solids content: 20%) was produced in the same manner as in Example 1 except that as the aqueous resin having the film-forming ability, a 30% emulsion of polyvinyl acetate (C-965, produced by Nissetsu Co., Ltd.) was used in place of the acryl emulsion. The test piece was subjected to the same testing as in Example 1. The results are shown in Table 3.

EXAMPLE 5

| | Parts |
|---|---|
| Ethylene-Vinyl Acetate Copolymer Emulsion (Panflex OM-4000, produced by Kuraray Co., Ltd.; solids content: 50%) | 100 |
| Organohydrogen Polysiloxane Emulsion (Syl-off 1171, produced by Dow Corning Corp.; solids content: 40%) | 35 |
| Diorganopolysiloxane Emulsion Containing Terminal Silicon-bonded Hydroxy Group (SM-8705, produced by Toray Silicone Co., Ltd.; solids content: 30%) | 125 |
| Curing Catalyst (Syl-off 1171A, produced by Dow Corning Corp.; solids content: 50%) | 8 |

An aqueous composition having the above formulation and a solids content of 15% was uniformly coated on a polyethylene film, which had been subjected to corona treatment, in a coating amount (solids basis) of 0.6 g/m² and treated in the same manner as in Example 1 to provide a test piece. The thus-obtained test piece was subjected to the same testing as in Example 1. The results are shown in Table 3.

COMPARATIVE EXAMPLE 1

To 100 parts of an acryl emulsion as used in Example 1 were added the following ingredients:

| | Parts |
|---|---|
| Organohydrogen Polysiloxane Emulsion (SH-8240, produced by Toray Silicone Co., Ltd.; solids content: 40%) | 20 |
| Diorganopolysiloxane Emulsion Containing Terminal Silicon-bonded Hydroxy Groups (SM-8705, produced by Toray Silicone Co., Ltd.; solids content: 30%) | 30 |
| Curing Catalyst (SM-7271K, produced by Toray Silicone Co., Ltd.; solids content: 50%) | 1 |

The thus-obtained aqueous composition having a solids content of 10% was coated on one side of a plasticized polyvinyl chloride film in the same manner as in Example 1 to provide a test piece. The test piece was subjected to the same testing as in Example 1, and the results are shown in Table 3.

COMPARATIVE EXAMPLE 2

| | Parts |
|---|---|
| Organohydrogen Polysiloxane Emulsion (SH-8200, produced by Toray Silicone Co., Ltd.; solids content: 40%) | 40 |
| Diorganopolysiloxane Emulsion Containing Terminal Silicon-bonded Hydroxy Groups (SM-8701, produced by Toray Silicone Co., Ltd.; solids content: 30%) | 90 |
| Curing Catalyst (DC-22K, produced by Dow Corning Corp.; solids content: 24%) | 5 |

An aqueous composition having the above formulation and a solids content of 10% was coated on one side of a plasticized polyvinyl chloride sheet in the same manner as in Example 1 to provide a test piece. The test piece was subjected to the same testing as in Example 1, and the results are shown in Table 3.

COMPARATIVE EXAMPLE 3

| | Parts |
|---|---|
| Ethylene-Vinyl Acetate Copolymer Emulsion as used in Example 5 | 100 |
| Organohydrogen Polysiloxane Emulsion (BX-12-806, produced by Toray Silicone Co., Ltd.; solids content: 40%) | 120 |
| Curing Catalyst (DC-22K, produced by Dow Corning Corp.; solids content: 24%) | 10 |

An aqueous composition having the above formulation and a solids content of 15% was uniformly coated on one side of a polyethylene film, which had been subjected to corona treatment, in a coating amount (solids basis) of 0.6 g/m² to provide a test piece. The test piece was subjected to the same testing as in Example 1, and the results are shown in Table 3.

TABLE 3

|  | Example | | | | | Comparative Example | | |
|---|---|---|---|---|---|---|---|---|
|  | 1 | 2 | 3 | 4 | 5 | 1 | 2 | 3 |
| Peel Strength (g/20 mm) | 105 | 92 | 112 | 120 | 95 | 276 | 114 | 235 |
| Residue Adhesion Strength (g/20 mm) | 301 | 314 | 315 | 308 | 297 | 284 | 172 | 193 |
| Residue Adhesion Strength Retention Ratio (g) | 86 | 90 | 90 | 88 | 85 | 81 | 49 | 55 |
| Peeling-Off Property | A | A | B | B | B | B | C | B |

The peel strength, residual adhesion strength, residual adhesion strength retention ratio, and peeling-off property were measured as follows:

Peel Strength

A clean adhesive tape was adhered onto the test piece and stored at 40° C. under a load of 20 g/cm² for 24 hours, and was then subjected to a 180° peel testing (at 20° C.) at a rate of 300 mm/min to measure the strain.

Residual Adhesion Strength

The adhesive tape which had been subjected to the foregoing peel strength testing was adhered onto a BA (Bright Annealed) stainless steel plate by moving a roller having a weight of 2 kg back and forth. After 30 minutes, the adhesive tape was subjected to a 180° peel testing (at 20° C.) at a rate of 300 mm/min to measure the strain.

Residual Adhesion Strength Retention Ratio

The residual adhesion strength is expressed in percent (%) with the adhesion strength (350 g/20 mm) of a clean adhesive tape onto a BA stainless steel plate being considered as 100%. This test is performed to examine the degree of stain of the adhesive on the adhesive tape due to release coating layer on a test piece.

Peeling-Off Property

The release coating layer side of the test piece was adhered onto a BA stainless steel plate, and another BA stainless steel plate was placed on the test piece. The thus-sandwiched member was stored under a load of 100 g/cm² while heating at 40° C. for 24 hours. Thereafter, the degree of stain of the BA stainless steel plate was examined. The symbols A, B and C have the following meanings:
A: clean;
B: Tolerably clean;
C: Stained.

As is apparent from Table 3, the release coating layers prepared according to the invention (Examples 1 to 5) have low peel strengths, and have high residual adhesion strengths and retention ratios. This indicates that the adhesion strength between the film substrate and the release coating layer is high, and that the release coating layers withstand the peeling by the adhesive tape and have high quality release characteristics.

Furthermore, it can be seen that when the acryl resin emulsion containing the functional group (Examples 1 and 2) is used as the aqueous dispersion of the resin having the film-forming ability, the peeling-off of the release coating layer does not occur even under severe conditions, and particularly good results are obtained.

In Comparative Example 1, the proportion of the acryl resin emulsion is greater than those of the other components. This example indicates that when the proportion of the acryl resin emulsion is great, the peel strength is greatly increased, and, at the same time, the residual adhesion strength and its retention ratio are reduced. This tendency becomes more significant during longer term storage testing.

In Comparative Example 2, the residual adhesion strength retention ratio is low and the results of the peeling property test are not satisfactory.

In Comparative Example 3, the peel strength is high and the residual adhesion strength retention ratio is low.

While the invention has been described in detail and with reference to specific embodiments thereof, it will be apparent to one skilled in the art that various changes and modifications can be made therein without departing from the spirit and scope thereof.

What is claimed is:

1. An aqueous composition for forming a release coating layer on a substrate comprising:
100 parts by weight (solids basis) of a mixture of (A) 100 parts by weight (solids basis) of an aqueous component of an organohydrogen polysiloxane containing at least three silicon-bonded hydrogen atoms represented by the formula (I):

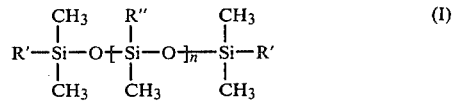

wherein R' is hydrogen or a methyl group, R" is hydrogen, an alkyl, aryl, or alkenyl group, and n is an integer of from 5 to 500, and (B) from about 100 to 2,000 parts by weight (solids basis) of an aqueous component of a diorganopolysiloxane containing a silicon-bonded hydroxy group at both terminals thereof, represented by the formula (II):

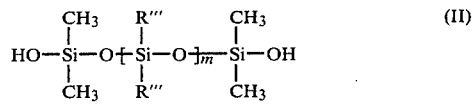

wherein R''' is a univalent hydrocarbon group which may be substituted, and m is an integer of from 100 to 15,000; and
from about 20 to 100 parts by weight (solids basis) of an aqueous resin having a film-forming ability bearing hydroxyl and/or carboxyl functional groups, wherein the solids content of the aqueous compositions is from about 1 to 60% by weight.

2. An aqueous composition as in claim 1, wherein the organohydrogen polysiloxane containing at least three silicon-bonded hydrogen atoms in the molecule has a viscosity of from about 10 to 100 cSt at 25° C.

3. An aqueous composition as in claim 1, wherein the diorganopolysiloxane containing a silicon-bonded hydroxy group at both terminals thereof has a viscosity of from about 10,000 to 1,000,000 cSt at 25° C.

4. An aqueous composition as in claim 1, further containing a curing catalyst for both polysiloxanes.

5. An aqueous composition as in claim 4, wherein the curing catalyst is selected from the group consisting of an acid, an alkali, an amine, and an organometallic salt.

6. An aqueous composition as in claim 4 or 5, wherein the amount of the curing catalyst added is from about 0.1 to 10 parts by weight per 100 parts by weight (solids basis) of the mixture of the aqueous components of organohydrogen polysiloxane and diorganopolysiloxane.

7. An aqueous composition as in claim 1, wherein the resin containing the functional group is prepared by copolymerizing 100 parts by weight of a base monomer comprising at least one of an alkyl acrylate monomer containing from 1 to 8 carbon atoms in the alkyl group portion and an alkyl methacrylate monomer containing from 1 to 8 carbon atoms in the alkyl group portion, from about 3 to 10 parts by weight of a carboxy group-containing copolymerizable monomer, and from about 1 to 30 parts by weight of a hydroxy group-containing copolymerizable monomer.

8. An aqueous composition as in claim 7, wherein the resin is prepared by copolymerizing the base monomer, the carboxy group-containing copolymerizable monomer, and the hydroxy group-containing copolymerizable monomer with a vinyl monomer copolymerizable with the base monomer.

9. An aqueous composition as in claim 1, 2, 3, 4, 5, 7 or 8, wherein the average ratio of $R''$=hydrogen to $R''$=an alkyl, aryl, or alkenyl group is from about 0.25/1 to 1.0/1, and n is an integer of from about 5 to 500.

10. An aqueous composition as in claim 3, wherein the viscosity of diorganopolysiloxane is from about 50,000 to 500,000 cSt at 25° C.

11. An aqueous composition as in claim 1, wherein the mixture comprises from about 300 to 1,000 parts by weight (solids basis) of the aqueous component of the diorganopolysiloxane per 100 parts by weight (solids basis) of the aqueous component of the organohydrogen polysiloxane.

* * * * *